(12) United States Patent
Mueller

(10) Patent No.: US 9,025,061 B2
(45) Date of Patent: May 5, 2015

(54) DEVICE HAVING AN OPTICAL MODULE AND A SUPPORTING PLATE

(75) Inventor: Gerhard Mueller, Bad Waldsee (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 32 days.

(21) Appl. No.: 13/637,417

(22) PCT Filed: Dec. 18, 2010

(86) PCT No.: PCT/DE2010/001500
§ 371 (c)(1),
(2), (4) Date: Sep. 26, 2012

(87) PCT Pub. No.: WO2011/120480
PCT Pub. Date: Oct. 6, 2011

(65) Prior Publication Data
US 2013/0016273 A1    Jan. 17, 2013

(30) Foreign Application Priority Data

Apr. 1, 2010    (DE) .......................... 10 2010 013 902

(51) Int. Cl.
*H04N 3/14* (2006.01)
*H04N 5/335* (2011.01)
*G03B 17/02* (2006.01)
*H04N 5/225* (2006.01)

(52) U.S. Cl.
CPC .............. *G03B 17/02* (2013.01); *H04N 5/2254* (2013.01); *H04N 5/2257* (2013.01)

(58) Field of Classification Search
USPC ................. 348/294, 298, 302, 308, 312, 374; 250/208.1; 257/290–292
See application file for complete search history.

(56) References Cited

U.S. PATENT DOCUMENTS

| 6,777,767 | B2 | 8/2004 | Badehi |
| 7,084,391 | B1* | 8/2006 | Chen ............................. 250/239 |
| 7,211,934 | B2 | 5/2007 | Fujiwara et al. |
| 7,433,555 | B2 | 10/2008 | Lee et al. |

(Continued)

FOREIGN PATENT DOCUMENTS

| EP | 1 796 376 | 6/2007 |
| EP | 2 166 395 | 3/2010 |

(Continued)

OTHER PUBLICATIONS

International Search Report of the International Searching Authority for International Application PCT/DE2010/001500, mailed Mar. 21, 2011, 3 pages, European Patent Office, HV Rijswijk, Netherlands.

(Continued)

*Primary Examiner* — Yogesh Aggarwal
(74) *Attorney, Agent, or Firm* — W. F. Fasse

(57) ABSTRACT

An optical device includes an optical module, e.g. with an objective lens, a printed circuit board, an image recording element and a supporting plate. In one embodiment, the optical module and the image recording element are arranged on one side of the supporting plate, the printed circuit board is arranged on the opposite side of the supporting plate, and the image recording element and the printed circuit board are contacted to each other through one or more openings in the supporting plate. In another embodiment, the image recording element is arranged in an opening in the supporting plate and directly joined to the printed circuit board.

20 Claims, 6 Drawing Sheets

(56) References Cited

U.S. PATENT DOCUMENTS

| | | |
|---|---|---|
| 7,785,024 B2 | 8/2010 | Fujimori |
| 7,859,033 B2 | 12/2010 | Brady |
| 2002/0044215 A1 | 4/2002 | Takagi et al. |
| 2003/0007084 A1 | 1/2003 | Nakjoh |
| 2003/0066955 A1 | 4/2003 | Schaub et al. |
| 2003/0171649 A1 | 9/2003 | Yokoi et al. |
| 2004/0100164 A1 | 5/2004 | Murata et al. |
| 2004/0189862 A1 | 9/2004 | Gustavsson et al. |
| 2006/0016973 A1 | 1/2006 | Yang et al. |
| 2006/0109367 A1* | 5/2006 | Hirooka ................. 348/340 |
| 2006/0191215 A1 | 8/2006 | Stark |
| 2007/0019952 A1 | 1/2007 | Fujimori |
| 2007/0200053 A1 | 8/2007 | Nomura et al. |
| 2007/0268399 A1 | 11/2007 | Kwak |
| 2007/0268470 A1 | 11/2007 | Shibazaki |
| 2008/0049127 A1 | 2/2008 | Maeda et al. |
| 2008/0265134 A1 | 10/2008 | Kinoshita |
| 2008/0296577 A1* | 12/2008 | Yuan et al. ................. 257/59 |
| 2010/0155247 A1 | 6/2010 | Cao et al. |
| 2010/0199491 A1 | 8/2010 | Watanabe et al. |

FOREIGN PATENT DOCUMENTS

| | | |
|---|---|---|
| JP | S61-123288 A | 6/1986 |
| JP | H06-113214 A | 4/1994 |
| JP | 10-107240 | 4/1998 |
| JP | 2001-128072 A | 5/2001 |
| JP | 2001-245217 A | 9/2001 |
| JP | 2004-335794 A | 11/2004 |
| JP | 2006-140384 | 6/2006 |
| JP | 2007-036481 A | 2/2007 |
| JP | 2007-208045 A | 8/2007 |
| JP | 2007-300489 A | 11/2007 |
| JP | 2007-312012 | 11/2007 |
| JP | 2008-258793 A | 10/2008 |
| JP | 2009-186756 A | 8/2009 |
| WO | WO 2006/121954 | 11/2006 |
| WO | WO 2009/004929 | 1/2009 |

OTHER PUBLICATIONS

International Preliminary Report on Patentability including English Translation of PCT Written Opinion of the International Searching Authority for International Application PCT/DE2010/001500, issued Oct. 2, 2012, 7 pages, International Bureau of WIPO, Geneva, Switzerland.

* cited by examiner

DEVICE HAVING AN OPTICAL MODULE AND A SUPPORTING PLATE

FIELD OF THE INVENTION

The invention relates to an optical device comprising an optical module, a printed circuit board and a supporting plate. An image recording element is arranged on the supporting plate or the printed circuit board.

BACKGROUND INFORMATION

Diverse joining techniques are used to join an optical module, such as an objective lens, to a support casing, such as an objective lens holder or a camera body, wherein the quality of cameras decisively depends on the quality of the joints between the optical module and the support casing and results from, inter alia, camera-intrinsic tolerances and mounting tolerances. Aside from that, positional tolerances, in particular the roll, yaw and pitch angles of, e.g., the objective lens in the support casing, considerably influence the functionality of a camera. In addition, a very good and long-time stable alignment of the optical module relative to the support casing is generally necessary regardless of the joining technique used.

An arrangement in which an objective lens holder is joined to a printed circuit board, such as a flexible printed circuit board, is often used to position an objective lens above an image recording element. An image recording element, such as an image sensor (imager), is arranged on the printed circuit board, wherein the printed circuit board itself is fixed to a supporting plate, wherein the image recording element is usually soldered to the printed circuit board. Alternatively, the image recording element is directly adhesively bonded to the printed circuit board using the chip-on-board technology and contacting is performed by means of bonds.

A disadvantage of the above-described optical devices for positioning an optical module above an image recording element consists in the fact that shrinkage occurring during the curing of the adhesive has a direct effect on the focusing of the optical device. Furthermore, a disadvantage of the arrangement consisting of the image recording element, the printed circuit board and the supporting plate, i.e., of the arrangement in which the image recording element is arranged above the printed circuit board and the printed circuit board is arranged above the supporting plate, consists in the fact that influences of the printed circuit board, such as tolerances, thermal behavior and aging, also have an effect on the focusing of the optical device since the optical module (objective lens) is directly joined to the printed circuit board by means of the objective lens holder. Aside from that, it is difficult to directly adhesively bond elements (such as an objective lens holder) to, e.g., a flexible printed circuit board as is the case with known devices.

Furthermore, a disadvantage of other known devices for aligning and joining an optical module above an image recording element consists in the fact that the design of the camera with many individual components is often complicated, which results in an increased manufacturing effort on account of complex components used in manufacturing.

SUMMARY OF THE INVENTION

It is therefore an object of an embodiment of the invention to provide an optical device, wherein the manufacturing and adjusting effort that has to be made in order to position an optical module above an image recording element is as little as possible and the optical device is as robust with respect to tolerances and influencing factors, such as thermal behavior and aging, as possible and has as few components that have to be joined to each other as possible.

An underlying idea of an embodiment of the invention involves arranging the image recording element directly on the supporting plate and mounting the printed circuit board below the supporting plate, which results in an advantageous arrangement of the image recording element, the supporting plate and the printed circuit board, wherein the image recording element is located directly on the supporting plate, which results in various advantages as compared to the prior-art devices. On the one hand, arranging the image recording element on the supporting plate results in a good thermal connection or thermal dissipation, particularly if the supporting plate is a metal plate. By arranging the optical module and the image recording element on one side of the supporting plate and by arranging the printed circuit board on the other side of the supporting plate, different components are advantageously separated from each other. In particular, this refers to the separation of passive components, such as the printed circuit board and further passive components (e.g., resistors) that are possibly arranged on the printed circuit board, from components that have to be joined to the supporting plate by means of special methods, e.g., by adhesive bonding and/or soldering. The purpose of said separation consists in, e.g., preventing individual active and passive components, e.g., the image recording element, from being rendered impure. Therefore, the printed circuit board is preferably populated with the passive components in a first procedure step and the image recording element is joined to the supporting plate in a later procedure step. Aside from that, the above-described influences, such as aging or thermal behavior of the printed circuit board, have no effect on the focusing of the optical device any more. According to an embodiment of the invention, the optical module, in particular an objective lens, can be adhesively bonded directly to the supporting plate, whereby the objective lens holder that is used in known optical devices can be dispensed with. Furthermore, the material of the supporting plate can be advantageously selected according to the demands made on adhesive bonding and according to the coefficient of expansion of the casing of the optical module. In another embodiment of the invention, the image recording element is arranged in an opening in the supporting plate and joined to the printed circuit board. The main advantage of this embodiment regarding the arrangement of the image recording element, the supporting plate and the printed circuit board, is that the optical module can be directly joined to the supporting plate but the image recording element is joined to the printed circuit board.

The optical device according to an embodiment of the invention comprises an optical module, an image recording element, a printed circuit board and a supporting plate. Furthermore, the optical device comprises electrical contacts between the image recording element and the printed circuit board.

Preferably, the supporting plate is designed in such a manner that the image recording element is arranged on one side and the printed circuit board is arranged on the other side.

Preferably, the optical module comprises at least one lens and is joined to the supporting plate, wherein the optical module is positioned, particularly on that side of the supporting plate on which the image recording element is arranged, above the image recording element. Preferably, the supporting plate and the optical module are joined to each other by adhesive bonding.

The invention provides an advantageous arrangement consisting of the image recording element, the supporting plate and the printed circuit board (image recording element above supporting plate above printed circuit board).

Aside from adhesive bonding, any other possible joining technique (e.g., soldering) may be used to join the optical module to the supporting plate.

The optical module is, e.g., an objective lens, an objective lens holder and/or a combination of an objective lens and an objective lens holder.

The printed circuit board, e.g., a flexible printed circuit board, preferably consists of an electrically insulating material and is realized with conductors adhering thereto and optionally with further electrical and/or electromechanical components.

Preferably, the image recording element is an image sensor (imager chip), such as a CMOS chip or a CCD chip.

The supporting plate may be a metal or ceramic plate, for example. Preferably, the supporting plate is made of the same material as the optical module, e.g., if the optical module is an objective lens, preferably of the same material as the casing of the objective lens. A further advantage of realizing the supporting plate as a metal plate particularly consists in the fact that this realization results in the long-time stability of the inventive optical device being higher than that of the prior-art devices.

In a preferred realization of the invention, the optical module, the image recording element and/or the printed circuit board are directly joined to the supporting plate, e.g., by adhesive bonding and/or soldering.

In an optional embodiment of the invention, the supporting plate comprises at least one opening. The at least one opening may be, e.g., a ring or a rectangle formed in the supporting plate and preferably formed next to or around the image recording element and/or partially below the image recording element. In particular, the image recording element and the printed circuit board are electrically contacted to each other through the at least one opening, preferably by means of bonds (e.g., wire bonds) that are led through the at least one opening.

In a further optional embodiment of the invention, the supporting plate has two openings that are preferably arranged on opposing sides of the image recording element, and optionally partially below the image recording element, in the supporting plate. In particular, the image recording element and the printed circuit board are electrically contacted to each other through the two openings, preferably by means of bonds that are led through the two openings.

In a preferred embodiment of the invention, the supporting plate has an opening that is realized in the shape of the image recording element, wherein the opening is optionally formed with a certain negative allowance with respect to the image recording element.

In a further optional embodiment, an opening is formed in the supporting plate, wherein the image recording element is arranged above and/or in the opening, wherein the image recording element and the printed circuit board are contacted to each other preferably by means of balls. To this end, the image recording element may be realized as a BGA (Ball Grid Array) imager, for example. A BGA imager comprises spherical solder contacts arranged on the bottom surface of the component, i.e., in an image recording element that is realized as a BGA imager, the contacts are preferably realized as solder balls arranged on the back of the image recording element. Each CMOS chip or CCD chip may be realized as a BGA imager.

Optionally, the image recording element and the printed circuit board can be contacted to each other by means of bonds, e.g., by wire bonding or chip bonding.

In a preferred realization of the invention, the optical module and/or the supporting plate and/or the printed circuit board are rotationally symmetrical.

In a preferred realization of the invention, the supporting plate is realized as a thin-walled and plate-shaped sheet metal part and may have a bent-up edge region. Preferably, the supporting plate has at least one wave-shaped shoulder, wherein the wave-shaped shoulder is preferably formed on that side of the plate surface of supporting plate on which the image recording element is arranged, wherein the shoulder may be arranged, e.g., circularly or annularly, around the image recording element, thereby particularly demarcating an internal volume around the image recording element, in which internal volume a casting compound for sealing may be arranged.

BRIEF DESCRIPTION OF THE DRAWINGS

Further advantages and optional realizations can be inferred from the description and the drawings. Exemplary embodiments are shown in the drawings in a simplified manner and explained in greater detail in the following description.

DETAILED DESCRIPTION OF EXAMPLE EMBODIMENTS OF THE INVENTION

Figure 1:
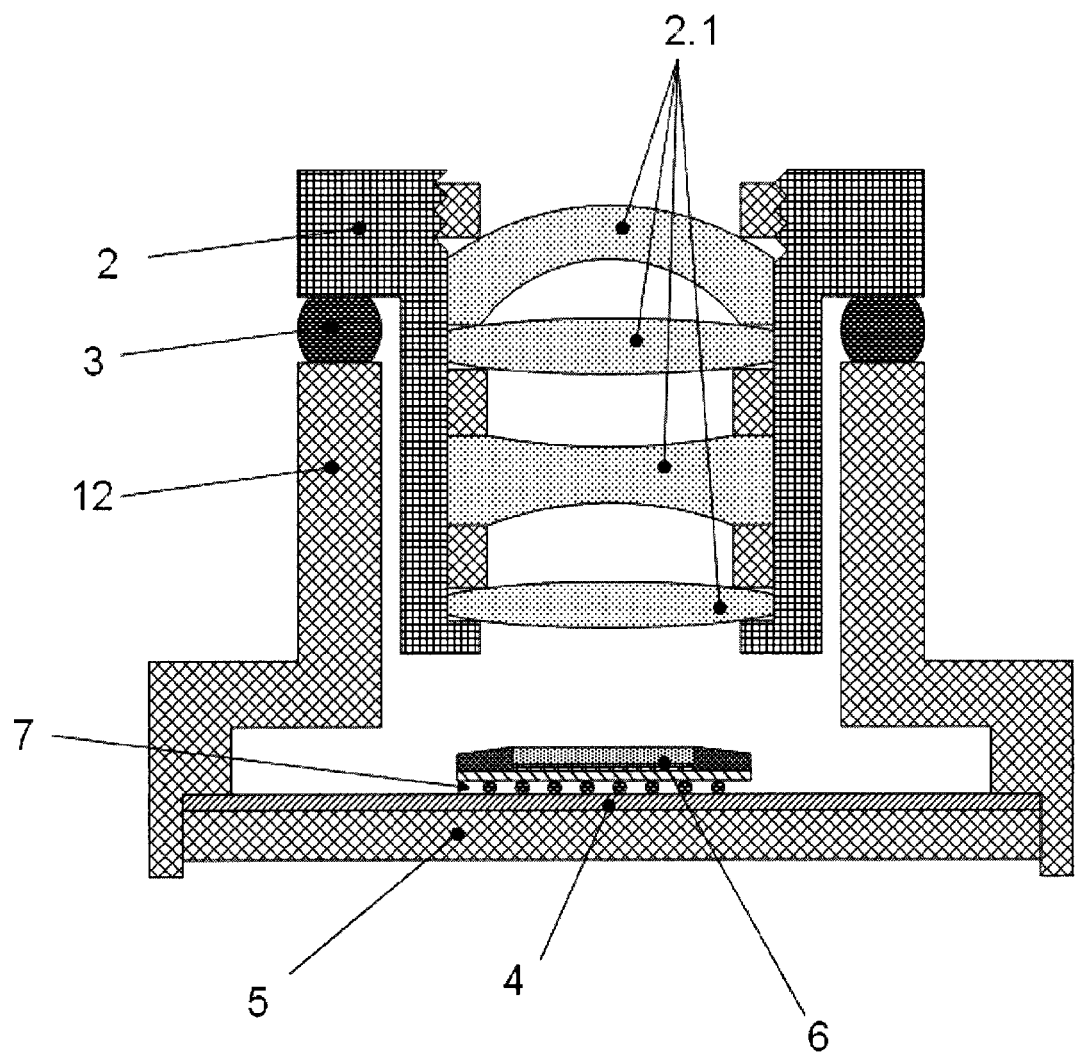
FIG. 1 is a schematic vertical sectional view of an optical device according to the prior art.

FIG. 1 shows an example for a prior-art optical device 1. An adhesive bead 3 is arranged between a support casing 12 (an objective lens holder in this example) and an optical module 2 (an objective lens in this example). The objective lens holder 12 is joined to an image recording element 6 by means of a printed circuit board 4, wherein a supporting plate 5 is arranged below the printed circuit board 4 and the image recording element 6 is arranged above the printed circuit board 4. The image recording element 6 shown in FIG. 1 is an image sensor contacted to the printed circuit board 4 by means of balls 7, or rather a ball-grid package image sensor. In particular, the ball-grid package image sensor is mounted on the printed circuit board by means of contacts that are compactly arranged on the bottom surface of the image sensor. The contacts are small solder balls that are preferably arranged next to each other in a grid that is composed of columns and lines. Said balls reflow, e.g., during soldering in a soldering furnace, whereafter they and the material (e.g., copper) of the printed circuit board fuse together. The objective lens holder 12 is directly joined to the printed circuit board 4. A disadvantage of the arrangement consisting of the image recording element, the printed circuit board and the supporting plate (image recording element 6 above printed circuit board 4 and printed circuit board 4 above supporting plate 5) shown in FIG. 1 consists in the fact that influences of the printed circuit board 4, such as tolerances, thermal behavior and aging, have a direct effect on the focusing of the optical device 1. The optical module 2 has several optical elements 2.1 (particularly lenses).

Figure 2:
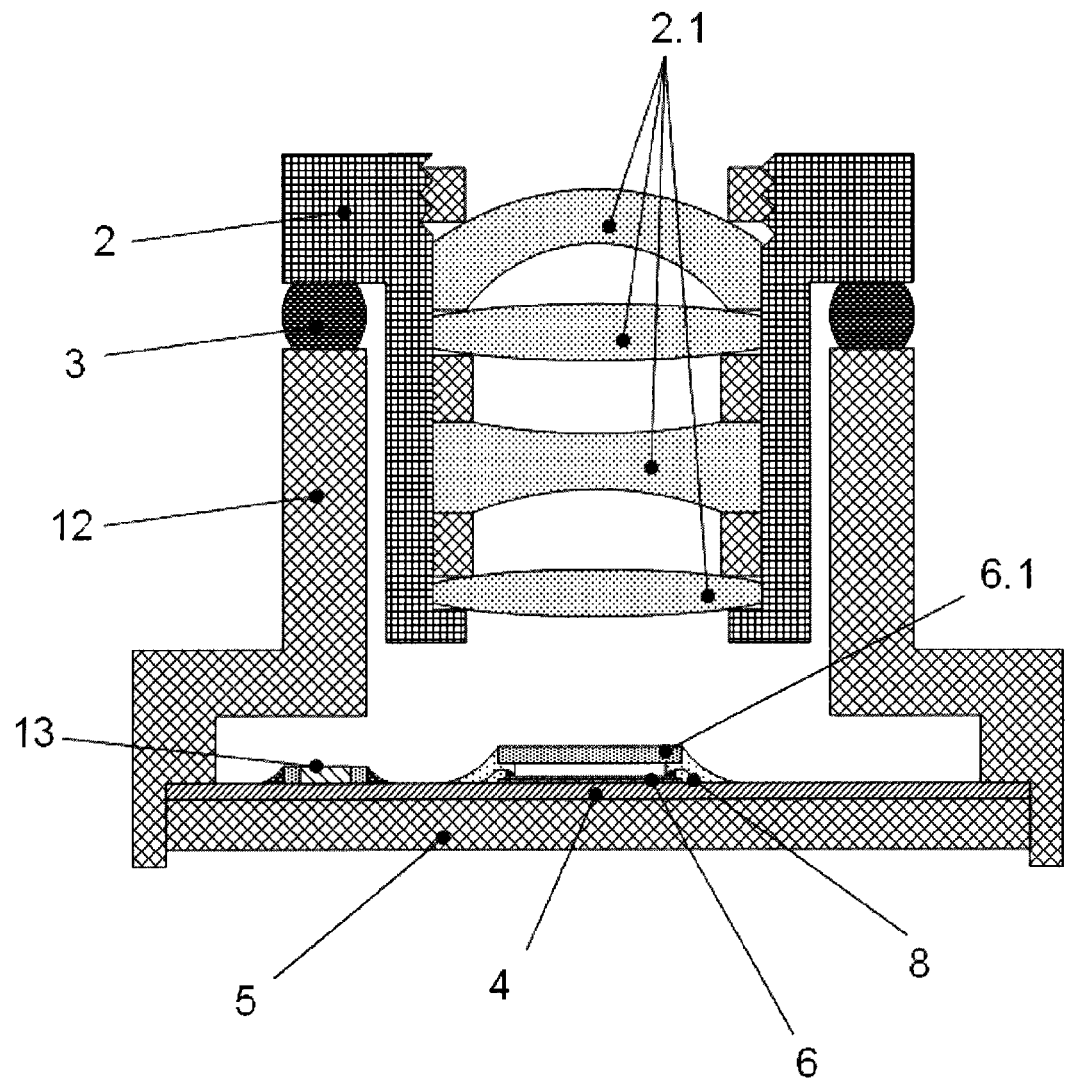
FIG. 2 is a schematic vertical sectional view of a different second embodiment of an optical device according to the prior art.

FIG. 2 shows a further example for a prior-art optical device 1. For the most part, the design of the optical device 1 corresponds to the description of FIG. 1, wherein the image recording element 6 in FIG. 2 is directly adhesively bonded to the printed circuit board 4 and wherein the image recording element 6 and the printed circuit board 4 are contacted to each other by means of bonds 8. Furthermore, the image recording element 6 in FIG. 2 has a covering glass 6.1. According to the invention, further passive components 13, e.g., electrical or electromechanical assemblies, may be arranged on the printed circuit board 4. In FIG. 2, a resistor, as an example for a possible further passive component 13, is arranged on the printed circuit board 4.

Figure 3:
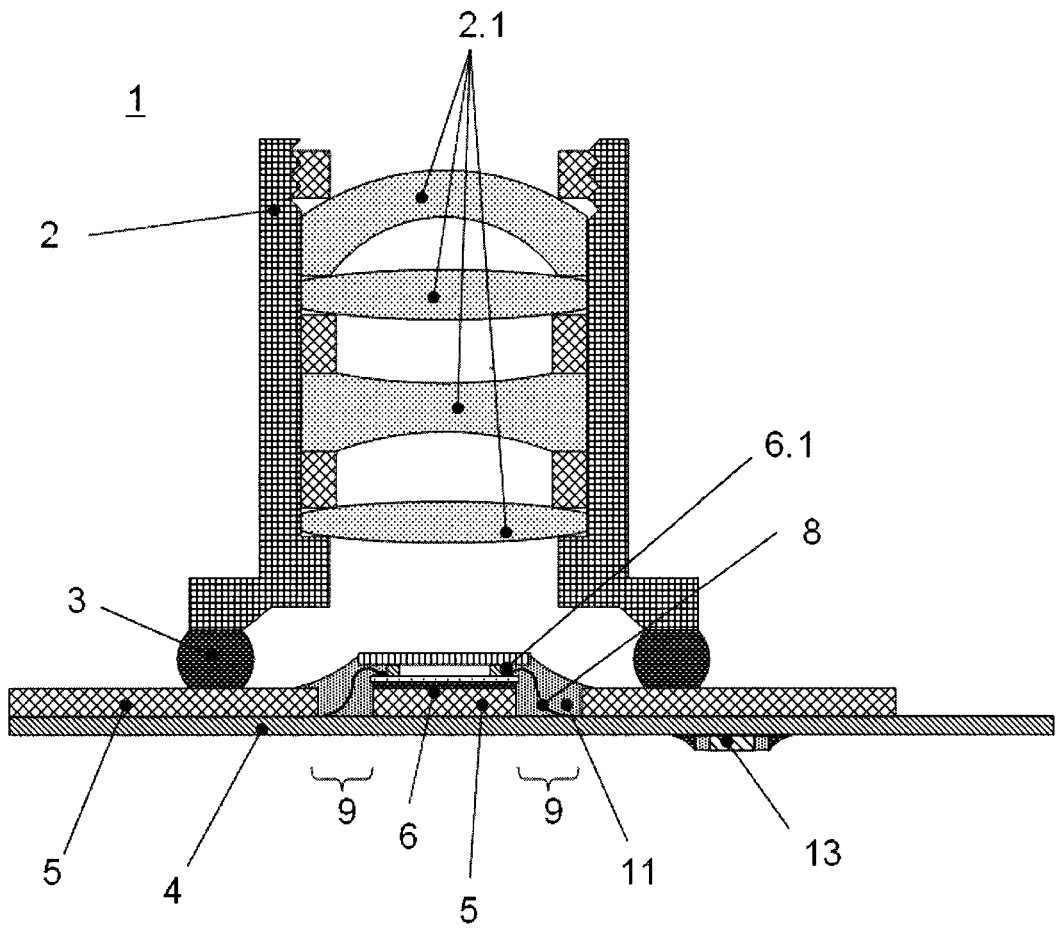
FIG. 3 is a schematic vertical sectional view of an optical device according to a first embodiment of the invention.

FIG. 3 shows an example for an inventive optical device 1. In this case, an image recording element 6 is directly arranged on a supporting plate 5 and joined thereto. A printed circuit board 4 with optionally one or with several passive components 13 (e.g., with one or several resistors) is located below the supporting plate 5. An optical module 2 is arranged above the image recording element 6 on the supporting plate 5 and directly joined to the supporting plate 5 by means of an adhesive joint, particularly by means of an adhesive bead 3, whereby, e.g., process and/or mounting tolerances can be compensated for. This results in an advantageous arrangement consisting of the image recording element, the supporting plate and the printed circuit board (image recording element 6 above supporting plate 5 and supporting plate 5 above printed circuit board 4). In FIG. 3, the image recording element 6 and the printed circuit board 4 are exemplarily contacted to each other by means of bonds 8 that are led through two openings 9 in the supporting plate 5, wherein the openings 9 are formed on opposing sides of the image recording element 6 in the supporting plate 5. Furthermore, an essential advantage of the invention can be inferred from the exemplary embodiment shown in FIG. 3. Said advantage consists in the fact that the optical module 2 (an objective lens in this example) is directly joined to the supporting plate 5. The complicated prior-art design including an additional component in the form of an objective lens holder 12 (see FIG. 1 and FIG. 2) is not necessary in this case.

The optical module 2 has several optical elements 2.1, wherein particularly at least one of the optical elements 2.1 is a lens.

According to the invention, the supporting plate 5, the printed circuit board 4, the image recording element 6, the passive component 13 and the optical module 2 may also be multipart components or have forms that are different from the forms shown in FIG. 3.

Figure 4:
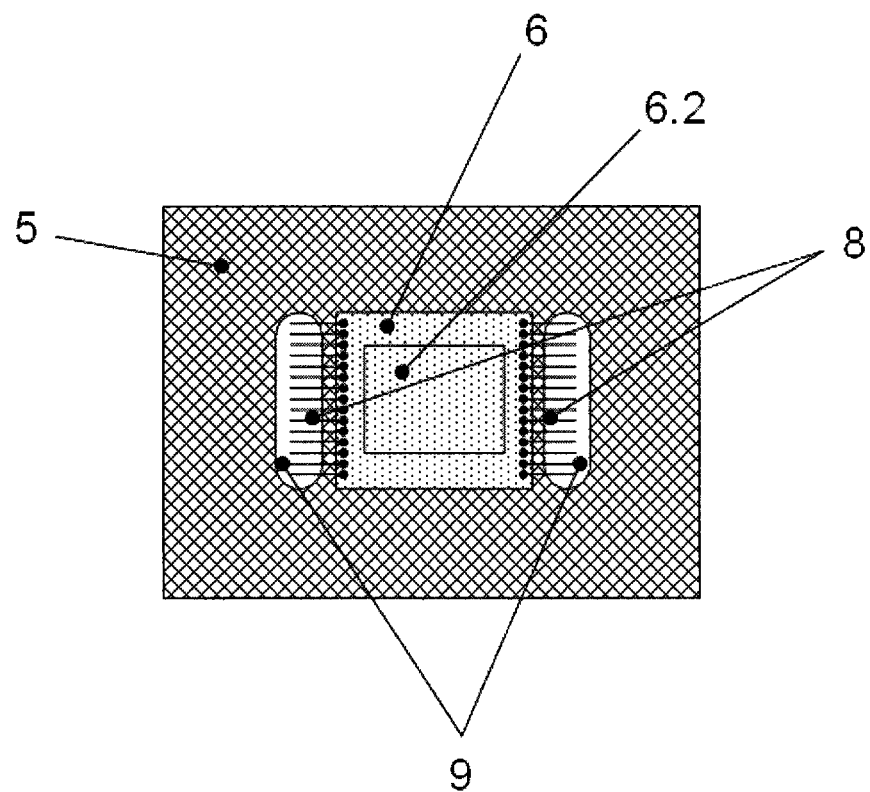
FIG. 4 is a top plan view of an image recording element mounted on a supporting plate in the first embodiment according to FIG. 3.

FIG. 4 shows a supporting plate 5 that may be arranged in an inventive optical device 1. In this case, two openings 9 are formed in the supporting plate 5. The image recording element 6 and the printed circuit board 4 are contacted to each other through the two openings 9 by means of bonds 8. The printed circuit board 4 that may be arranged, according to the invention, below the supporting plate 5 is not shown in FIG. 4. In particular, the image recording element 6 in FIG. 4 has an active region 6.2. According to the invention, the supporting plate 5, the image recording element 6 and the openings 9 may also be multipart components or have forms that are different from the forms shown in FIG. 4.

Figure 5:
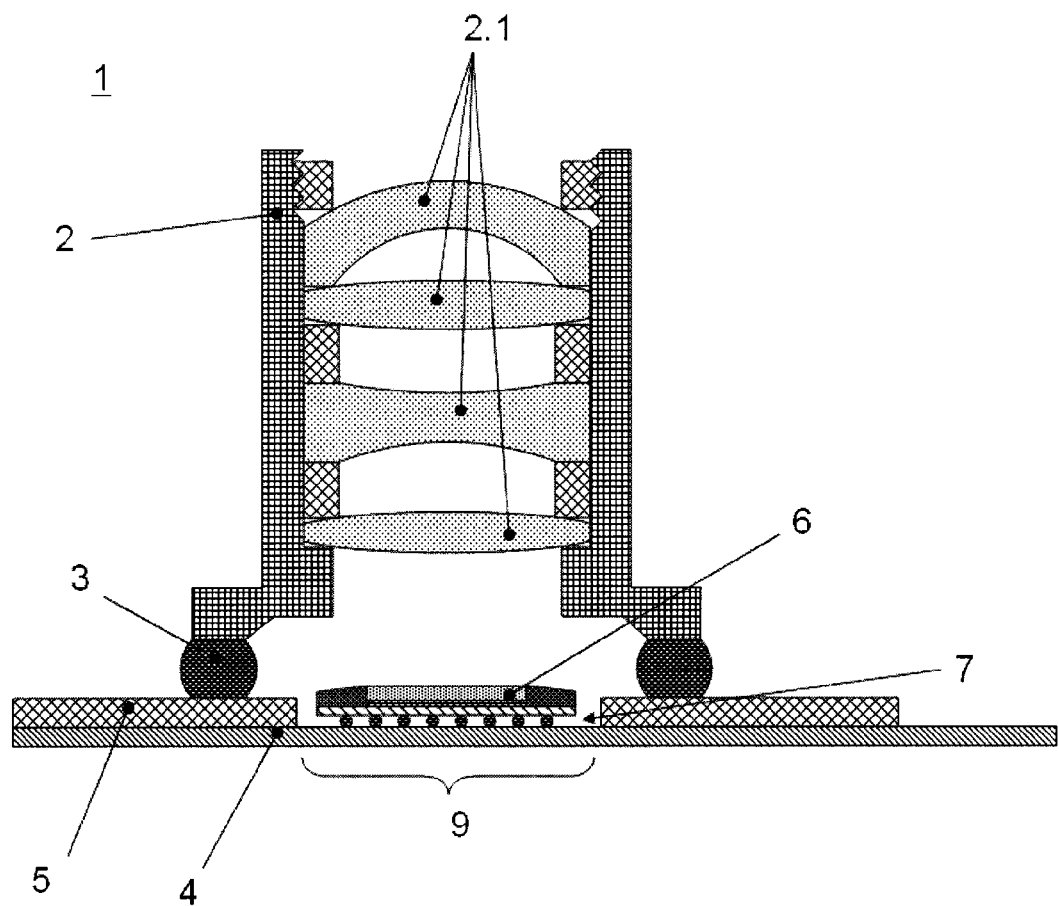
FIG. 5 is a schematic vertical sectional view of an optical device according to a second embodiment of the invention.

FIG. 5 shows a further example for an inventive optical device 1. For the most part, the design of the optical device 1 corresponds to the description of FIG. 3. In FIG. 5, however, an opening 9 is formed in the supporting plate 5 below the image recording element 6. The image recording element 6 (a BGA imager in this case) is arranged in the opening 9 of the supporting plate 5 and directly on the printed circuit board 4.

Figure 6:
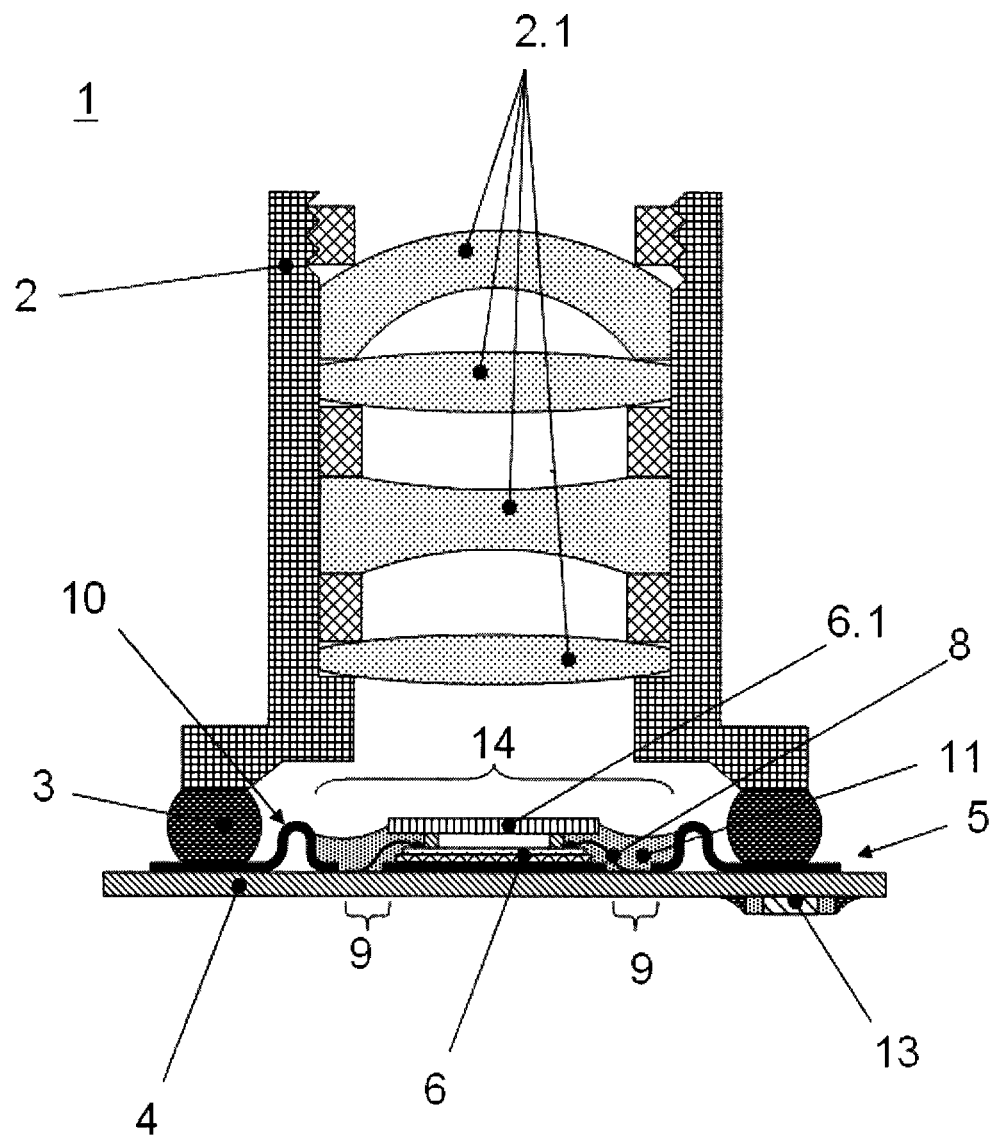
FIG. 6 is a schematic vertical sectional view of an optical device according to a third embodiment of the invention.

FIG. 6 shows a further example for an inventive optical device 1. For the most part, the design of the device 1 corresponds to the description of FIG. 3. In FIG. 6, however, the supporting plate 5 may particularly be a cast part or a diecast part as well as a stamping, a deep-drawn part and/or a pressed part, e.g., made of sheet metal, wherein the supporting plate 5 is realized as a thin-walled and plate-shaped sheet metal part and has a wave-shaped shoulder 10, wherein the wave-shaped shoulder 10 is formed around the image recording element 6 and demarcates an internal volume 14 in which a casting compound 11 is arranged. Furthermore, the image recording element 6 comprising a covering glass 6.1 is joined to the printed circuit board 4 through openings 9 in the supporting plate 5 by means of bonds 8.

LIST OF REFERENCE NUMERALS

1 optical device
2 optical module
2.1 optical element
3 adhesive bead
4 printed circuit board
5 supporting plate
6 image recording element
6.1 covering glass
6.2 active region
7 balls
8 bonds
9 opening
10 wave-shaped shoulder
11 casting compound
12 support casing
13 passive component
14 internal volume

The invention claimed is:

1. An optical device comprising an optical module, a printed circuit board, an image recording element, electrical contacts between the image recording element and the printed circuit board, and a supporting plate, wherein the optical module and the image recording element are arranged on a first side of the supporting plate and the printed circuit board is arranged on a second side opposite the first side of the supporting plate such that the supporting plate is situated between the printed circuit board and the image recording element.

2. The optical device according to claim 1, characterized in that the optical module, the image recording element and/or the printed circuit board are directly joined to the supporting plate.

3. The optical device according to claim 1, characterized in that at least one opening is provided in the supporting plate, and the image recording element and the printed circuit board are electrically contacted to each other by the electrical contacts comprising bond conductors extending through the at least one opening.

4. The optical device according to claim 1, characterized in that two openings are provided in the supporting plate.

5. The optical device according to claim 4, characterized in that the two openings are provided laterally adjacent to the image recording element on two opposing sides of the image recording element in the supporting plate.

6. The optical device according to claim 1, characterized in that at least one opening is provided in the supporting plate laterally adjacent to the image recording element.

7. An optical device comprising an optical module, a printed circuit board, an image recording element, electrical contacts between the image recording element and the printed circuit board, and a supporting plate, wherein the optical module and the image recording element are arranged on one side of the supporting plate and the printed circuit board is arranged on an other side of the supporting plate, and the supporting plate is a thin-walled sheet metal part having at least one wave-shaped shoulder that demarcates an internal volume in which a casting compound is arranged.

8. An optical device comprising an optical module, a printed circuit board, an image recording element, electrical contacts between the image recording element and the printed circuit board, and a supporting plate, wherein the optical module is arranged on one side of the supporting plate, the printed circuit board is arranged on an other side of the supporting plate, the image recording element is mounted and supported on a surface of the printed circuit board in an opening in the supporting plate, the supporting plate has a planar plate shape extending parallel to a plane of the printed circuit board, and the supporting plate is limited to a space extending along the plane and between the optical module and the printed circuit board.

9. The optical device according to claim 8, characterized in that the optical module and the printed circuit board are directly joined to the supporting plate.

10. The optical device according to claim 8, characterized in that the electrical contacts comprise balls by which the image recording element and the printed circuit board are contacted to each other.

11. The optical device according to claim 8, characterized in that the optical module, the supporting plate and/or the printed circuit board are rotationally symmetrical.

12. The optical device according to claim 8, characterized in that the optical module and the supporting plate are joined to each other by an adhesive joint.

13. The optical device according to claim 1, characterized in that the optical module, the supporting plate and/or the printed circuit board are rotationally symmetrical.

14. The optical device according to claim 1, characterized in that the optical module and the supporting plate are joined to each other by an adhesive joint.

15. The optical device according to claim 1, wherein the image recording element is mounted on and supported by a top surface of the supporting plate.

16. The optical device according to claim 15, wherein the supporting plate has an opening therein, and the image recording element is mounted on the top surface of the supporting plate laterally adjacent to and offset from the opening.

17. The optical device according to claim 1, wherein the supporting plate has a planar plate shape extending along a plane located between the image recording element and the printed circuit board, and the supporting plate is limited to a space extending along the plane and between the image recording element and the printed circuit board.

18. The optical device according to claim 8, wherein the image recording element does not contact the supporting plate.

19. The optical device according to claim 8, wherein the optical module is mounted on and supported by the supporting plate.

20. The optical device according to claim 8, wherein the image recording element extends higher than the supporting plate upwardly away from the printed circuit board.

* * * * *